April 23, 1968  C. E. ERICKSON  3,378,934
LINT TRAP FOR CLOTHES DRYERS

Filed July 28, 1966  2 Sheets-Sheet 1

INVENTOR.
Clifford E. Erickson
BY
Attorney

April 23, 1968  C. E. ERICKSON  3,378,934
LINT TRAP FOR CLOTHES DRYERS
Filed July 28, 1966  2 Sheets-Sheet 2
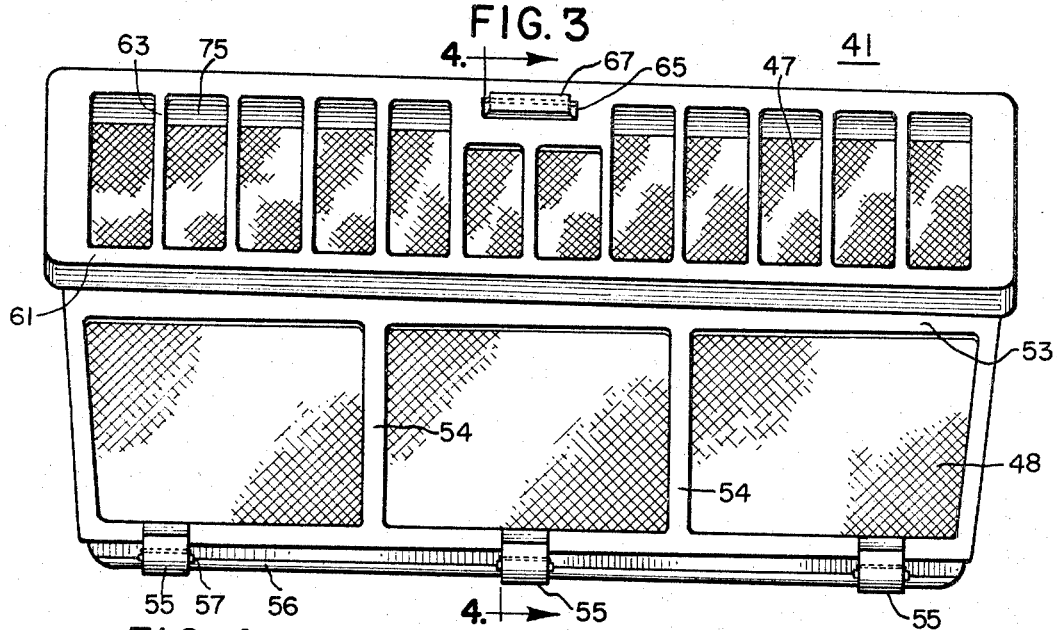
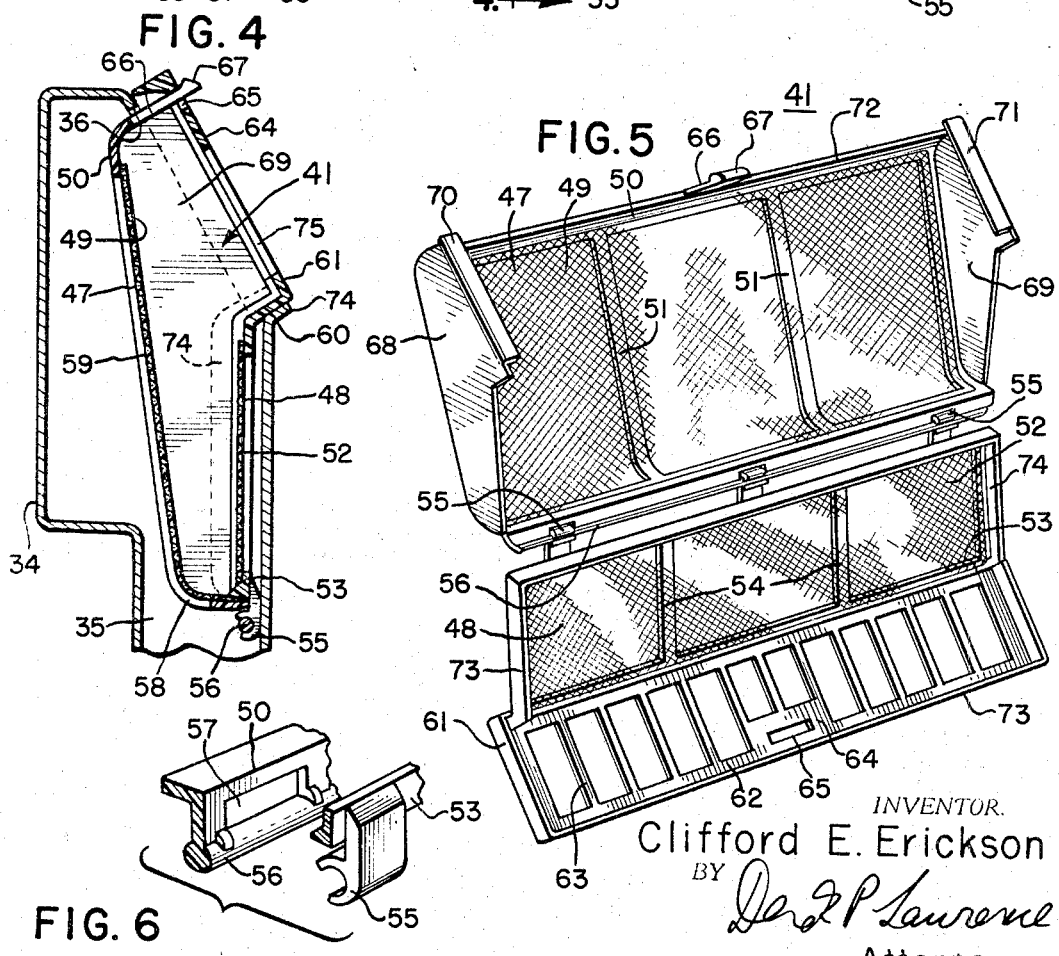
INVENTOR.
Clifford E. Erickson
BY
Attorney United States Patent Office 3,378,934
Patented Apr. 23, 1968

3,378,934
LINT TRAP FOR CLOTHES DRYERS
Clifford E. Erickson, Chicago, Ill., assignor to General Electric Company, a corporation of New York
Filed July 28, 1966, Ser. No. 568,424
7 Claims. (Cl. 34—82)

This invention relates to clothes dryers, and more particularly to an improved lint trap for use in such dryers.

It is an object of my invention to provide an improved lint trap for a clothes dryer wherein the lint trap is of a shape providing a large lint-catching area, yet at the same time takes up a relatively small amount of room.

A further, more specific, object of my invention is to provide such a lint trap wherein the lint-catching area thereof is readily accessible.

More specifically, another object of my invention is to provide a lint trap having a generally U-shaped configuration which can be opened, so that the interior surfaces thereof are easily accessible upon removal from the clothes dryer.

In carrying out my invention in one form thereof, my improved lint trap is provided for use in a clothes dryer of the conventional type wherein the clothes receptacle communicates with an exhaust duct having an inlet opening positioned for convenient manual access. Heated air flows through the receptacle and then enters the exhaust duct, passing into the exhaust duct through the inlet opening thereof. The lint trap has first and second sides which are hinged together at their bottoms so that, in a first relationship, they provide a generally U-shaped configuration. The major part of the first and second sides is foraminous so that air may pass therethrough but all lint, except for very small particles, is caught and retained.

The sides are pivotable to a second relationship wherein the surfaces which form the inside of the U-shaped cross-section become easily and independently accessible. When the sides are in their first relationship, the trap may be inserted in the exhaust duct so that air passing from the receptacle into the exhaust duct must pass into the top of the U-shaped configuration of the trap and then out through the foramina formed therein. The tops of the sides are cooperative with the duct inlet so that they retain the trap at the inlet opening of the duct, with the first and second sides of the trap extending generally in the direction of flow.

With this construction it can readily be seen that the trap has a configuration which does not take up an excessive amount of room, yet which provides a large lint-catching area and is positioned in the usual way for convenient access. Upon removal the trap may easily be cleaned by virtue of the hinged relationship of the sides.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

In the drawings, FIGURE 1 is a side elevational view of the clothes dryer incorporating my improved lint trap, the view being partly broken away and partly sectionalized in order to illustrate details;

FIGURE 3 is a front elevational view of the lint trap of FIGURE 2;

FIGURE 4 is a view along line 4—4 in FIGURE 3;

FIGURE 5 is a view in perspective similar to the view of FIGURE 2, but with the lint trap in the position suitable for cleaning; and FIGURE 6 is an enlarged fragmentary view in perspective illustrating the pivotal connection of the sides of the lint trap.

Figure 1:
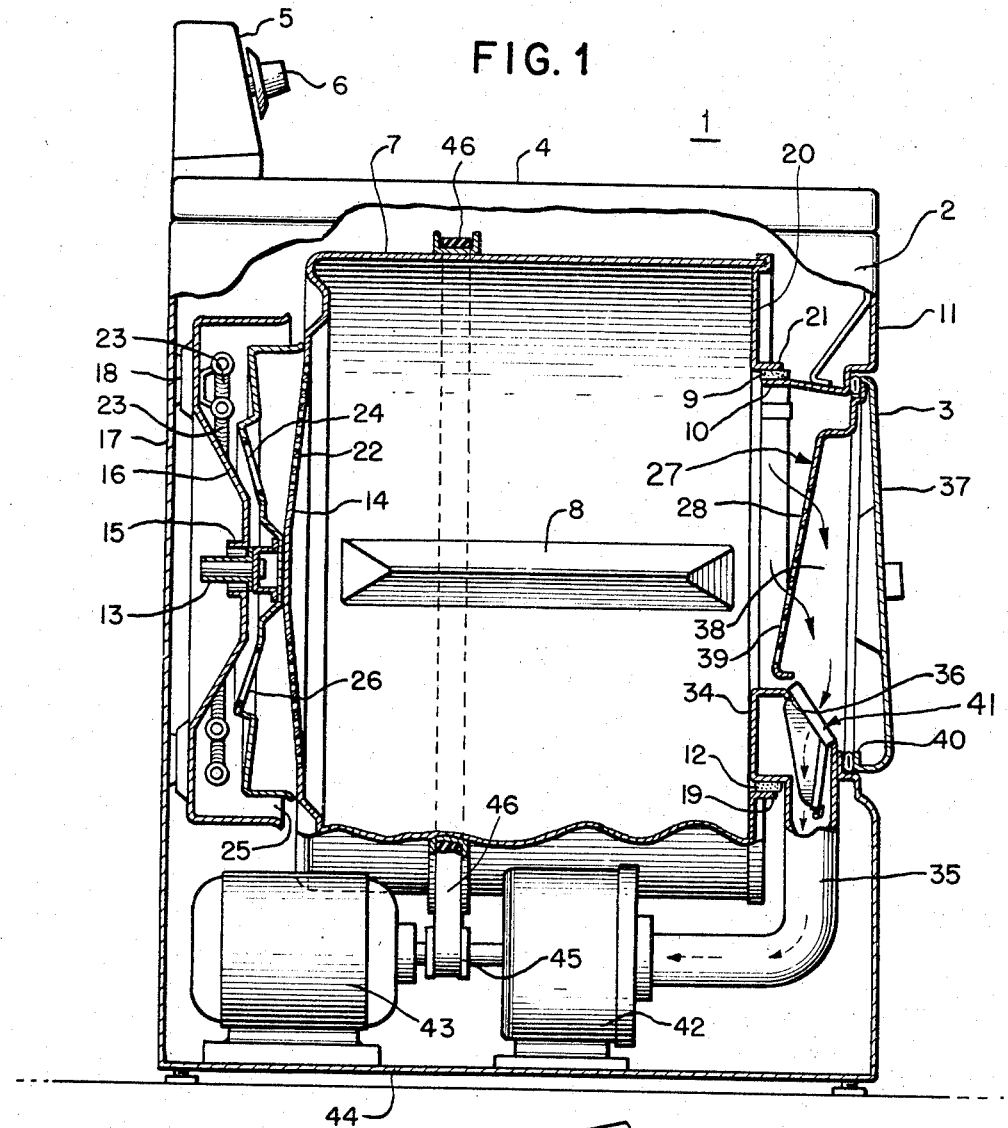

Referring now to FIGURE 1, the machine illustrated is a domestic clothes dryer generally indicated by the numeral 1. Dryer 1 is provided in the usual way with a cabinet 2 having front door 3 to provide access to the interior of the cabinet for loading and unloading clothes. Mounted on the top wall 4 of cabinet 2 is a control panel 5 which may include a suitable manual control 6 connected to a conventional sequence control assembly (not shown). In the usual way, by manual setting of the control 6 the machine will be caused to start and automatically proceed through a cycle of operation.

Within cabinet 2 there is provided a clothes tumbling receptacle or drum 7 which constitutes a chamber for receiving fabrics to be dried, and which is mounted for rotation on a substantially horizontal axis. Drum 7 is substantially cylindrical in shape and has its outer cylindrical wall substantially imperforate as shown. On the interior surface of the cylindrical wall there is provided a plurality of clothes tumbling ribs 8 so that clothes are lifted up when the drum rotates and are then tumbled back down to the bottom.

The front of dum 7 may be supported for rotation within outer casing 2 by suitable nylon support pads, one of which is shown by the numeral 9. These pads are secured to the outer surface of a flange 10 extending inwardly from the front surface 11 of cabinet 2 so as to provide a frame for door 3. Two pads such as 9 may be provided, one on each side of the center of drum 7 so as to provide a stable support for the front thereof. The circumferential space between pads may be filled with felt material such as that shown at 12 so that there will not be openings permitting the undesired passage of air.

The rear end of drum 7 receives its support by means of a stub shaft 13 extending from the center of rear wall 14 of the drum. Shaft 13 is secured within a bearing 15 formed in a baffle 16 which in turn is rigidly secured to the back wall 17 of cabinet 2 by any suitable means such as, for instance, welding at a number of points 18. With the arrangement shown, the basket may rotate on a horizontal axis, that is, with pads 9 providing the front support and stub shaft 13 within bearing 15 providing the rear support.

In order to permit the flow of a stream of drying air through the clothes drum, the drum has a central aperture 19 formed in its front wall 20. The flange 21 which defines opening 19 is supported by the pads 9 in sliding relationship so that the drum 7 may rotate on its axis. The stream of drying air is permitted to enter through the rear wall 14 of drum 7 through a plurality of perforations 22, the perforations in the present case being formed to extend around the rear wall in an annulus.

As has been stated, baffle member 16 is rigidly secured to rear wall 17 of cabinet 2. Baffle member 16 also serves to support heating means 23. Elements 23 may be annular in shape so as to be generally coextensive with the perforations 22 in drum wall 14. A baffle member 24 is rigidly secured to the back wall 14 of the drum outside the ring of perforations 22 and within the stationary baffle 16 so that an annular air inlet 25 is, in effect, formed by baffles 16 and 24. In this manner a passage is formed for air to enter annular inlet 25 between the baffles, pass over the heater 23, and then pass through openings 26 formed in baffle 24 to the interior of drum 7.

The front opening 19 of the drum is substantially closed by means of a stationary bulkhead generally indicated by the numeral 27. Bulkhead 27 is made up of several adjacent members including the inner surface 28 of access door 3, the inturned flange 10, and the inner surface 34 of an exhaust duct 35 having an inlet opening 36.

Front opening 19, in addition to serving as part of the air flow path through the drum, also serves as a means whereby clothes may be loaded into and unloaded from the drum. Door 3, whose inner surface forms part of the bulkhead closing the opening, is mounted on cabinet 2 so that when the door is opened clothes may be inserted into or removed from the drum through the door frame 10. It will be observed that the door includes an outer flat imperforate section 37 and an inwardly extending hollow section 38 mounted on the flat outer section. Hollow section 38 extends into the door frame 10 when the door is closed, and the door surface 28 which comprises part of the combination bulkhead 27 is actually the inner wall of the hollow section.

The air outlet from the drum is provided by a perforated opening 39 formed in the inner wall 28 of hollow door section 38. The bottom wall section of door 3 has an opening 40 formed therein so that when the door is closed opening 40 is aligned with inlet opening 36 of exhaust duct 35. It will be understood that the frame 10 of the door is interrupted at the bottom part thereof so that a portion thereof is formed by the inlet 36 of the exhaust duct.

As shown, a lint trap 41 whose construction forms the main feature of my invention is positioned at the inlet 36 of exhaust duct 35.

Duct 35 leads downwardly to a blower 42 which is then suitably connected to an exhaust (not shown) from the dryer. Blower 42 is directly driven by an electric motor 43 supported on base 44 of dryer 1. In addition to driving blower 42, motor 43 constitutes the means for effecting rotation of drum 7, being provided on its shaft with a small pulley 45. A belt 46 extends around pulley 45 and entirely around the cylindrical wall of drum 7. The relative circumferences of pulley 45 and drum 7 cause the drum to be driven by the motor at a speed suitable to effect tumbling of the clothes therein. Thus, the air is pulled into the drum over the heating elements, as previously described, and then is passed from the drum through the perforations 39 in the door 3, into the lint trap 41, duct 35, and blower 42 which expels the air from the dryer.

At the same time, the fabrics in the drum are tumbled so that the heat air passing through the tumbling clothes causes vaporization of moisture from the clothes. The vapor is carried off with the air as it passes out of the machine. Of course, the tumbling of the clothes causes lint to be also carried off by the moving air, and it is this lint which is trapped by the lint trap 41.

Referring now also to the other figures of the drawings, lint trap 41 includes two main members, or side members, 47 and 48. The major part of the area of side 47 is foraminous, being formed with a screen 49 secured to a plastic frame 50 and further supported by intermediate plastic strengthening members 51. Similarly, side 48 has the major part of its area foraminous, being formed with the screen 52 supported within a frame 53 and further strengthened by intermediate members 54.

Members 47 and 48 are hinged together at their bottoms so as to have a pivotal relationship to each other. To achieve this, frame 53 of member 48 may have integrally formed therewith three partially closed hollow projections such as the one shown by the numeral 55 in FIGURE 6. Similarly, frame 50 of member 47 may have integrally formed therewith a rod-shaped base 56, with openings 57 being formed in alignment with each of the partially hollow members 55 between rod section 56 and frame 50. It will readily be seen that the two members may be formed separately and then, simply by snapping the sections 55 of member 48 over section 56 of member 47, the two side members are secured together in a pivotal relationship, with all motion being prevented except for the desired pivoting.

Member 47 has a curved formation which provides a base area 58 and a side area 59 (FIGURE 4). As a result of this, when the two sides 47 and 48 are pivoted to the point where base 58 of side 47 is substantially at right angles to the side 48, a generally U-shaped configuration results (note particularly FIGURE 4).

Figure 2:
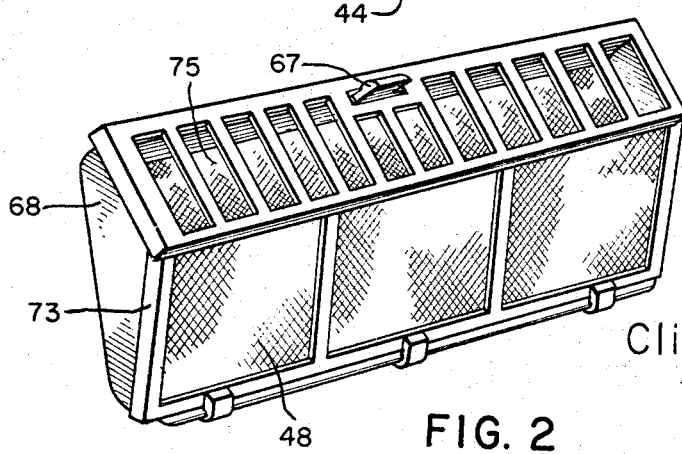
FIGURE 2 is a view in perspective of the improved lint trap of my invention as used in the dryer of FIGURE 1.

An intermediate section 60 on side 48 leads up to a section 61 formed integrally therewith and thereabove. Section 61 is at an angle to section 60 so that, when sides 47 and 48 are in the position shown in FIGURE 4, section 61 slants back toward side 47. Section 61, as readily seen in FIGURES 2, 3 and 4, is made up of a frame 62 having widely-spaced bars 63 extending from side to side. Section 61 also includes a portion 64 with an opening 65. When sides 47 and 48 provide their U-shaped configuration, a catch member 66 formed at the top of side 47 passes through the opening 65, and the enlarged end 67 of catch 66 releasably secures the two sides 47 and 48 in the U-shaped configuration as shown.

Side 47 has end portions 68 and 69 formed in planes generally perpendicular to the foraminous area thereof. While end portions 68 and 69 may be formed with foramina if so desired, the area thereof is relatively small, and it is economically preferable to form them solid, as shown. End portions 68 and 69 terminate in flanges 70 and 71 respectively. When the two sides 47 and 48 are in the position shown in FIGURE 4, the frame 62 of part 61 seats upon the flanges 70, 71, and the edge 72 which joins them.

End flanges 73 and 74 on side 48 cooperate with end portions 68 and 69 on side 47 to close the two ends of the trap so that the air which passes in through section 61 must necessarily pass out through the foraminous area of the two sides 47 and 48.

Sides 47 and 48 may be formed as two molded parts which can be snapped together into their pivotal relationship as described. In use, the trap is closed by engagement of catch 66 in opening 65. At this point the trap may readily be inserted through opening 36 forming the inlet to duct 35 and may be moved down, with sides 47 and 48 extending in the general direction of the air flow in the duct (see FIGURE 1), until the outer flange sections 71 and 72 seat upon the edges forming the duct opening 36, with intermediate section 60 seated on the lower lip 74 of the duct opening (FIGURE 4). It will be observed (FIGURE 3) that the ends of sides 47 and 48 slant out a little from the bottom to the top; this facilitates insertion of the trap in the duct opening.

The entrance 75 to lint trap 41 now forms the only passage for air to escape from drum 7 and into duct 35. The air, in order to escape from the lint trap, must pass out through the foraminous areas thereof. In so doing, the lint is trapped and held on the screen areas 49 and 52.

It will be observed that although the trap does not take up very much room because of its U-configuration, it nevertheless provides quite a substantial amount of foraminous area so that the air flow is impeded to a relatively small extent, and so that a substantial amount of lint can be trapped before it is necessary to clean the trap. In order to effect cleaning, the lint trap 41 is removed from duct inlet 36 simply by grasping it by bars 63 and lifting upwardly and outwardly. Then the lint trap may be opened by disengaging catch 66 from opening 65 so that the two sides 47 and 48 may be moved to the position shown in FIGURE 5. In this position, of course, it is a simple matter to manually remove the lint and throw it away, and then snap the lint trap closed again for reinsertion into opening 36 and reuse.

The structure provides for a large foraminous area while taking up a relatively small amount of room, this being quite important where a limited straight length of duct is provided, as is quite often the case. Further, it does not have the disadvantage of most pocket-type traps presently in use that the lint is hard to get at with one's fingers. Rather, it is an exceedingly simple matter to open the trap, scrape off the lint with one's fingers (or a brush, if so desired), and then close the trap again.

It will further be seen that the structure is a highly economical one, formed simply by two independently molded parts which are snapped together to provide the operative structure.

While in accordance with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. For use in a clothes dryer of the type having a clothes receptacle and an exhaust duct with an inlet opening positioned for convenient manual access, wherein a flow of heated air passes through the receptacle and then enters the exhaust duct, an improved lint trap comprising:
   (a) first and second sides having the major part thereof foraminous, said sides:
       (i) being hinged together at the bottom thereof;
       (ii) providing a generally U-shaped cross-sectional configuration in a first relationship;
       (iii) being pivotable to a second relationship in which the surfaces forming the inside of the said U-shaped cross-section are easily and independently accessible;
   (b) said trap being insertable in said exhaust duct when said sides are in said first relationship;
   (c) means at the top of said sides cooperatively effective with the duct inlet opening to retain said trap at said opening with said sides extending generally in the direction of flow; and
   (d) means closing the ends of said U-shaped configuration so that air flows into said trap at the top of said U-shaped configuration and flows out of said trap only through the foramina formed therein.

2. The structure defined in claim 1 wherein each of said sides is foraminous.

3. The structure defined in claim 2 wherein each said side includes a substantially rectangular frame section and a screen secured within said frame section.

4. The structure defined in claim 1 including means at the tops of each of said sides cooperatively effective to releasably latch said sides in said first relationship.

5. The structure defined in claim 1 wherein one of said sides includes a top section extending across the top of said U to the other of said sides for securement to the other of said sides, said top section including bars spaced so as to prevent entry of small articles of clothing without any substantial effect on the flow of air.

6. The structure defined in claim 5 wherein said top section includes edge sections adapted to seat on the structure of said exhaust duct inlet opening for retention thereon with said sides extending down into said duct.

7. The structure defined in claim 1 wherein one of said sides is longer than the other of said sides, the other of said sides having a top section slanting upwardly and across to said one side when said sides are in their first relationship, said trap being adapted to be inserted in said exhaust duct inlet opening with said shorter side remote from said clothes receptacle.

References Cited
UNITED STATES PATENTS

| | | | |
|---|---|---|---|
| 2,862,306 | 12/1958 | Morrill | 34—82 |
| 2,735,507 | 2/1956 | Vogel | 34—82 XR |
| 3,040,552 | 6/1962 | Platt et al. | 68—18.1 |
| 3,320,678 | 5/1967 | Berke | 34—82 |

FREDERICK L. MATTESON, JR., *Primary Examiner.*

H. B. RAMEY, *Assistant Examiner.*